United States Patent [19]

Iizuka et al.

[11] Patent Number: 5,224,563
[45] Date of Patent: Jul. 6, 1993

[54] ENERGY REGENERATING MECHANISM OF AN AUTOMOBILE

[75] Inventors: Souichi Iizuka, 26-12, Ohara 2-chome, Setagaya-ku, Tokyo 156; Yasuharu Yamada, Chiba, both of Japan

[73] Assignee: Souichi Iizuka, Tokyo, Japan

[21] Appl. No.: 967,554

[22] Filed: Oct. 27, 1992

Related U.S. Application Data

[63] Continuation of Ser. No. 643,466, Jan. 18, 1991, abandoned.

[30] Foreign Application Priority Data

May 23, 1990 [JP] Japan .................................. 2-131326

[51] Int. Cl.⁵ .............................................. B60K 1/02
[52] U.S. Cl. .................... 180/65.3; 180/65.5; 180/165
[58] Field of Search ............ 180/65.3, 65.5, 65.1, 180/165, 65.4, 246

[56] References Cited

U.S. PATENT DOCUMENTS

| 4,270,622 | 6/1981 | Travis | 180/65.3 |
| 4,625,823 | 12/1986 | Frank | 180/165 |

FOREIGN PATENT DOCUMENTS

| 2529451 | 2/1977 | Fed. Rep. of Germany | 180/65.3 |
| 377110 | 4/1907 | France | 180/65.4 |
| 2502076 | 9/1982 | France | 180/65.1 |
| 566225 | 9/1975 | Switzerland | 180/65.4 |

Primary Examiner—Eric D. Culbreth
Attorney, Agent, or Firm—Flynn, Thiel, Boutell & Tanis

[57] ABSTRACT

There is disclosed an energy regenerating mechanism of an automobile, particularly to that adapted for an electric car. The energy regenerating mechanism is characterized in that a plurality of generators are provided so that the kinetic energy generated when the engine idles and the automobile continues running is converted into electric energy.

4 Claims, 4 Drawing Sheets

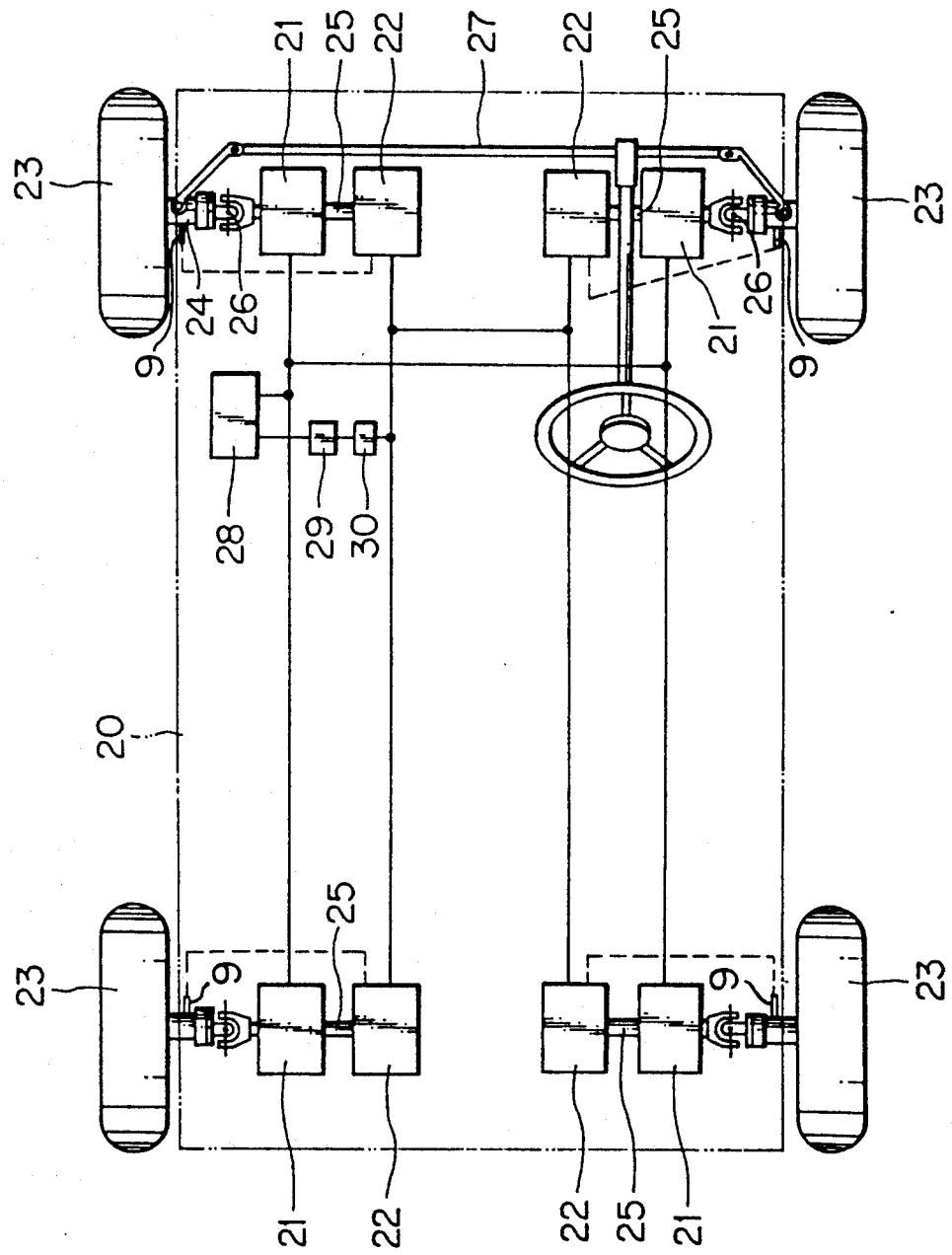

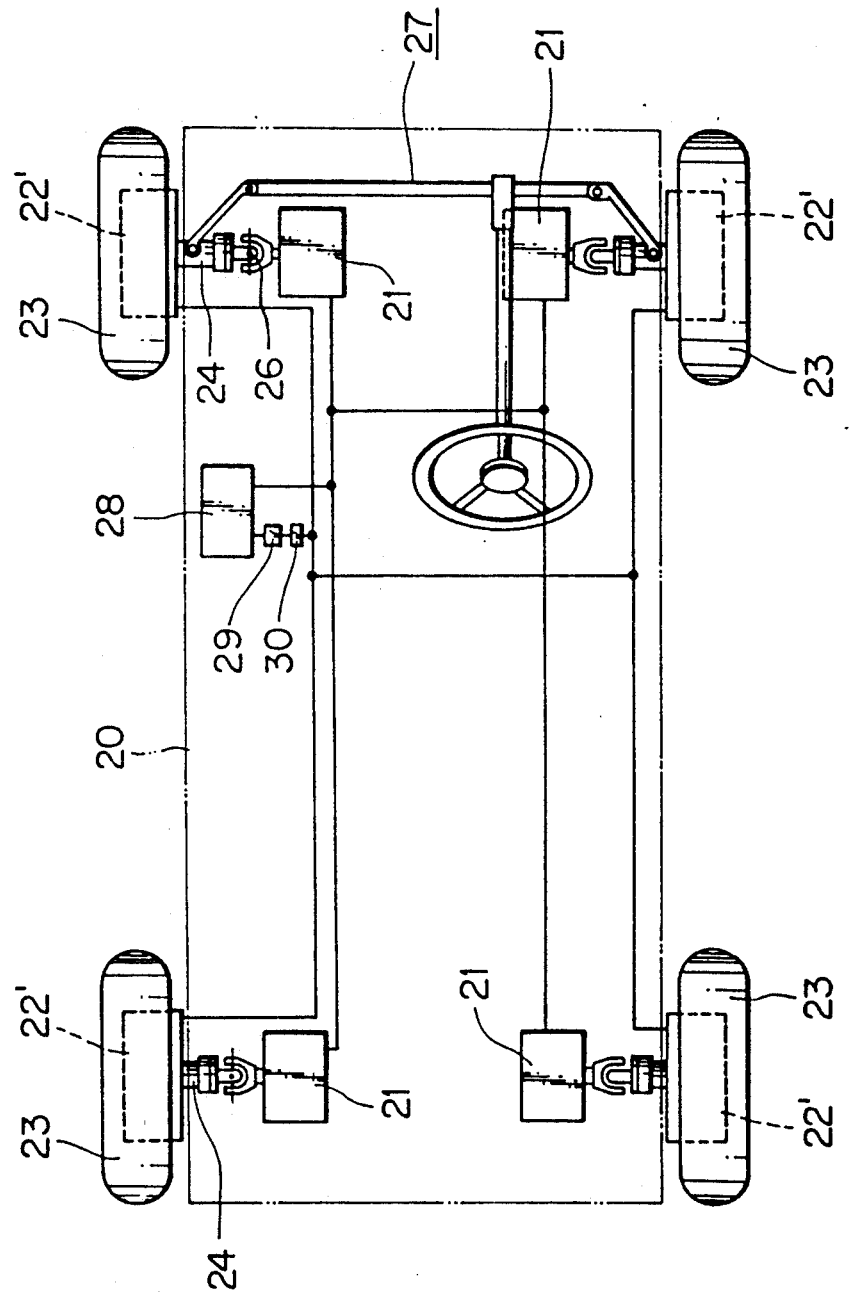

ENERGY REGENERATING MECHANISM OF AN AUTOMOBILE

This application is a continuation of U.S. Ser. No. 07/643 466, filed Jan. 18, 1991 now abandoned.

BACKGROUND OF THE INVENTION

1. Field of the Invention

The present invention relates to an energy regenerating mechanism of an automobile for utilizing the kinetic energy of the moving automobile when motive power is not being supplied to the automobile particularly to an energy regenerating mechanism of an electric car capable of increasing the travel distance available from a single charging of the battery.

2. Prior Art

There have been invented various mechanisms for collecting or utilizing the kinetic energy of a moving automobile while the engine idles as disclosed in Japanese Patent Publication No. 54-95424 in which the turning of a drive shaft is transmitted to the kinetic energy transmission shaft and is accumulated in elastic springs, in Japanese Patent Publication No. 46-25884 in which the kinetic energy of an automobile is accumulated as compressed air or in Japanese Patent Laid-open Publication No. 55-156724 in which the kinetic energy is accumulated by utilizing a distortion of an elastic member. Furthermore, there is disclosed Japanese Patent Laid-Open Publication No. 46-41767 for collecting the electric energy.

The conventional various mechanisms for collecting the kinetic energy physically accumulate the kinetic energy of the automobile, and utilize the accumulated energy at the start of the engine. However, these mechanisms are complex and cannot accumulate energy sufficiently. Hence they are difficult to put into practical use.

Particularly, an electric car can run practically for about 150 Km per day, based on a single full charging of its battery. Hence, it takes much time for charging the battery per day since the output of the full charged battery can be consumed in a day. This was one of the obstacles to widely putting electric cars into practice.

SUMMARY OF THE INVENTION

The present invention has been made to solve the problems set forth above.

It is therefore an object of the present invention to provide an energy regenerating mechanism of an automobile (hereinafter referred to as energy regenerating mechanism) capable of converting the kinetic energy of the moving automobile into electric energy and accumulating the electric energy in a battery, particularly adapted for use in electric automobiles.

To achieve the above object, the energy regenerating mechanism according to a first aspect of the the present invention comprises a motor fixed to a drive shaft having a first clutch member at one end thereof and a gear at the other end thereof, a wheel shaft connected to wheels at both ends thereof and having a differential gear at the central portion thereof for meshing with the gear of the drive shaft, the gear and the differential gear being housed in a differential gear box, a shaft arranged coaxial with the drive shaft and having a second clutch member at one end thereof and a bearing at the other end thereof, a plurality of generators mounted on the shaft at predetermined spaced intervals for receiving the kinetic energy of the moving automobile when the accelerator pedal is not depressed and the first and the second clutches are connected with each other, and converting the kinetic energy of the automobile into electric energy, and a battery connected between the motor and the plurality of generators for receiving the electric energy from the plurality of the generators, the battery supplying the electric energy to the motor when the travel speed of the automobile is accelerated.

An energy regenerating mechanism according to a second aspect of the present invention comprises front and rear motors and front and rear generators respectively fixed to a mobile chassis, the front and rear motors being connected with front and rear wheels by front and rear driving shafts, the front and rear generators being connected to the front and rear motors by front and rear coupling shafts, characterized in deriving the kinetic energy of the automobile when the automobile continues to move while the acceleration pedal is not depressed from the driving shafts, converting the thus derived kinetic energy to electric energy, storing the electric energy in a battery, and utilizing the electric energy when the travel speed of the automobile is accelerated.

An energy regenerating mechanism according to third and fourth aspects of the present invention comprises front and rear motors and front and rear generators respectively fixed to a mobile chassis, the front and rear motors being connected with front and rear wheels by front and rear driving shafts, the front and rear generators, being connected with the front and rear motors by front and rear coupling shafts, characterized in deriving from the driving shafts the kinetic energy of the moving automobile while the motors are not driving the driving shafts, converting the thus derived kinetic energy into electric energy, storing the electric energy in a battery, and utilizing the electric energy when the travel speed of the automobile is accelerated.

The above and other objects, features and advantages of the present invention will become more apparent from the following description taken in conjunction with the accompanying drawings.

BRIEF DESCRIPTION OF THE DRAWINGS

FIG. 5 is a plan view of assistance in explaining the operation of energy regenerating mechanism according to a third embodiment of the present invention; and FIG. 6 is a plan view of assistance in explaining the operation of energy regenerating mechanism according to a fourth embodiment of the present invention.

Figure 1:
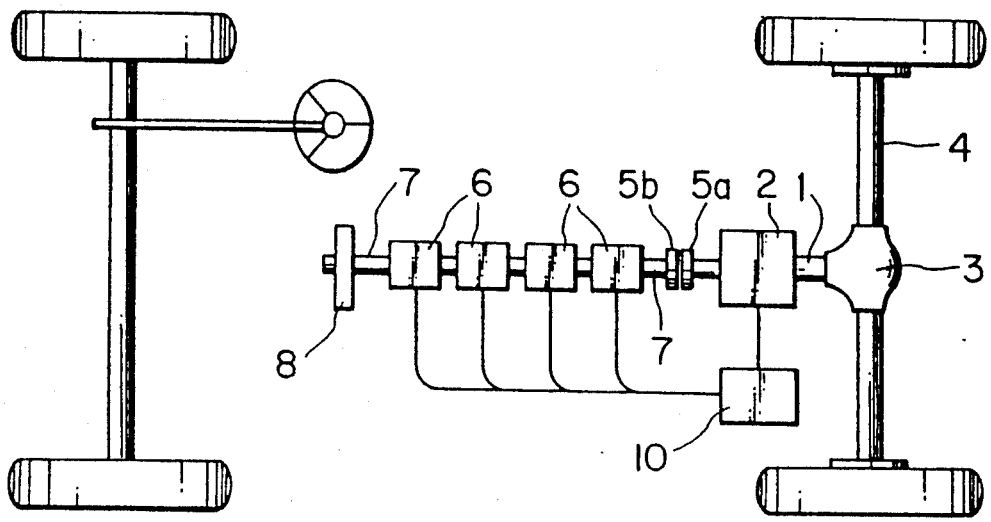
FIGS. 1 and 2 are respectively plan views of assistance in explaining the operation of energy regenerating mechanism according to a first embodiment of the present invention.
Figure 2:
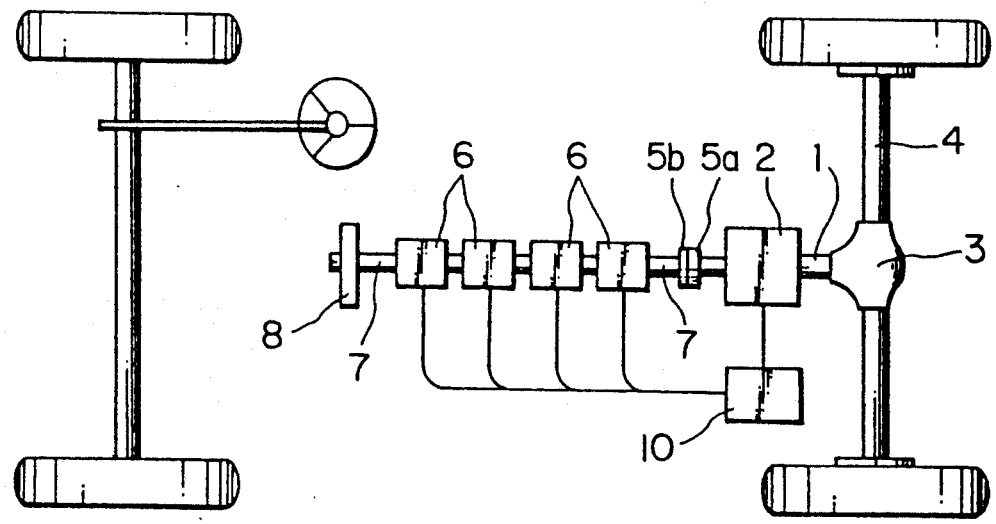
Figure 3:
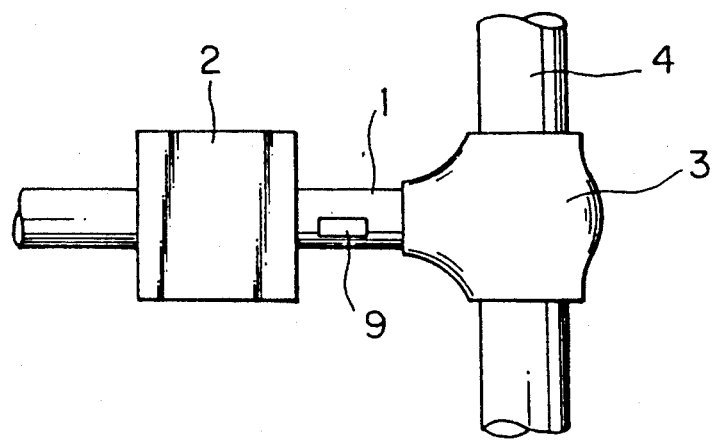
FIG. 3 is a plan view of a part of the energy regenerating mechanism of the first embodiment.

PREFERRED EMBODIMENT OF THE INVENTION First Embodiment (FIGS. 1 to 3)

An energy regenerating mechanism according to a first embodiment of the present invention will be described with reference to FIGS. 1 to 3.

The energy regenerating mechanism comprises a motor 2 fixed to a drive shaft 1 having a first clutch member 5a at one end thereof and a gear (not shown) at the other end thereof housed in a differential gear box 3, a wheel shaft 4 connected with wheels at both ends thereof and having a differential gear (not shown) at the central portion thereof housed in the differential gear box 3 for meshing with the gear of the drive shaft 1, a shaft 7 arranged coaxial with the drive shaft 1 and having a second clutch member 5b at one end thereof and a bearing 8 at the other end thereof, a plurality of generators 6, 6 . . . mounted on the shaft 7 at predetermined spaced intervals for receiving a mechanical force caused by the kinetic energy of the moving automobile when the engine idles, namely, in the state where the accelerator pedal is not depressed by the driver's foot and the first and the second clutche members 5a and 5b are connected with each other and converting the kinetic energy into electric energy, and a battery 10 connected between the motor 2 and the plurality of generators 6, 6 . . . for receiving the electric energy from the plurality of the generators 6, 6 and supplying driving energy to the motor 2 when the speed of the automobile is to be accelerated.

The energy regenerating mechanism will be described more in detail. The driving force of the motor 2 is transmitted to the wheel shaft 4 via the differential gear box 3 so that the automobiles starts to move.

The plurality of generators 6, 6 ... arranged on the shaft 7 positioned opposite to the motor 2 are high efficiency generators. The bearing 8 is supported on the chassis (not shown).

A strain gauge 9 may be provided on the drive shaft 1 for detecting the positive or negative torque of the drive shaft 1, as illustrated in FIG. 3, so that the clutche members 5a, 5b are connected with or disconnected from each other. That is, the clutche members 5a, 5b are connected with each other, in the case of positive torque and disconnected from each other in the case of negative torque. Alternatively, the clutch members 5a, 5b are connected with or disconnected from each other by turning on or off the motor 2. That is, the clutche members 5a, 5b are connected with each other when the motor 2 is ON or disconnected from each other when the motor is OFF.

An operation of the energy regenerating mechanism of the automobile according to the first embodiment of the present invention will be described hereinafter.

The output of the motor 2 is transmitted to the wheel shaft 4 by meshing the gear of the drive shaft 1 with the differential gear of the wheel shaft 4. At this time, the first and the second clutche members 5a, 5b are disconnected from each other so that all the output of the motor 2 is utilized for running the automobile. Successively, the automobile runs without interruption. When the clutch members 5a, 5b are connected with each other for thereby operating the generators 6, 6, the generators 6, 6 . . . convert the kinetic energy of the moving automobile into the electric energy and allow the battery 10 to accumulate the electric energy therein.

As described in detail above, the regenerating mechanism does not operate at the time of starting of the automobile due to disconnection of the clutche members 5a, 5b. Hence the output of the motor 2 is transmitted to the wheel shaft 4 via the drive shaft 1.

When the output of the motor 2 is discontinued while the automobile is moving, the clutche members 5a, 5b are connected with each other so that the kinetic energy of the moving automobile is supplied by way of the drive shaft 1 to the generators 6, 6 . . . which convert the kinetic energy to electric energy. The thus converted electric energy is charged in the battery 10.

The electric energy stored in the battery 10 is utilized, for example, for accelerating the travel speed of the automobile.

Accordingly, inasmuch as the kinetic energy can be converted to electric energy and accumulated in the battery 10 with a simple mechanism, the travel distance available from a single full charging of the battery can be increased conspicuously so that the automobile can run for about three days.

When the automobile is decelerated or is stopped by braking the automobile, the energy regenerating mechanism also operates in the same manner as set forth above.

Figure 4:
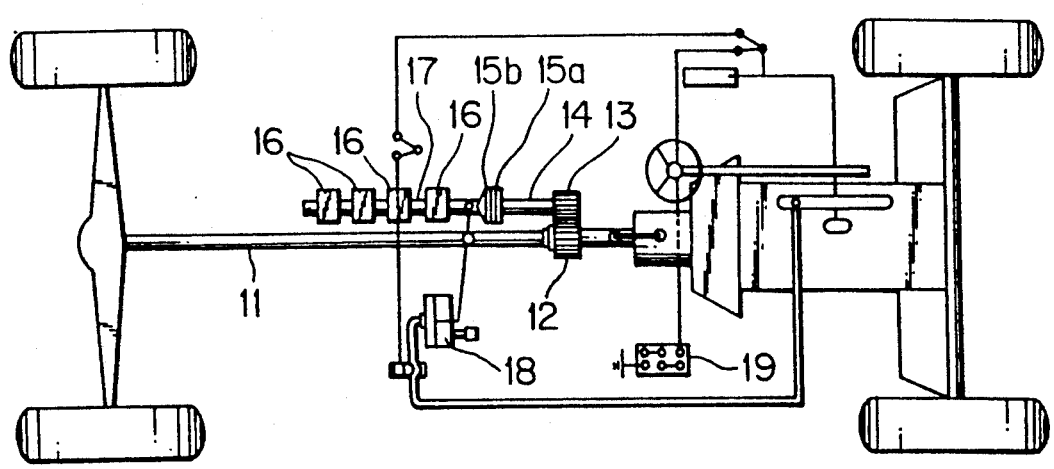
FIG. 4 is a plan view of assistance in explaining the operation of energy regenerating mechanism according to a second embodiment of the present invention.

Second Embodiment (FIG. 4)

An energy regenerating mechanism according to a second embodiment of the present invention will be described with reference to FIG. 4.

The energy regenerating mechanism of the second embodiment is adapted for use in an automobile provided with a gasoline engine.

The constituents of the second embodiment are substantially same as the first embodiment.

The energy regenerating mechanism comprises a drive shaft 11 having a gear 12 at the front portion thereof, a first shaft 14 disposed in parallel with the drive shaft 11 and having a gear 13 meshing with the gear 12 of the drive shaft 11 at one end thereof and a first clutch member 15a at the other end thereof, a second shaft 17 disposed coaxially with the first shaft 14 and having a second clutch member 15b engageable with the first clutch member 15a at one end thereof, a plurality of generators 16, 16 . . . mounted on the second shaft 17 for converting the kinetic energy supplied by the drive shaft 11 into electric energy, a manifold 18 for connecting the first clutch member 15a with the second clutch member 15b in the case of positive pressure and for disconnecting the first clutch member 15a from the second clutch member 15b in the case of negative pressure, and a battery 19 for accumulating the converted electric energy.

The electric energy accumulated in the battery 19 can be used in accessories of the automobile which consume high power such as high luminance head lamps.

The same effect as that of the first embodiment can be achieved according to the second embodiment.

Third Embodiment (FIG. 5)

An energy regenerating mechanism according to a third embodiment of the present invention will be described with reference to FIG. 5.

The third embodiment relates to the energy regenerating mechanism in an electric automobile.

An energy regenerating mechanism comprises front and rear motors 21 and front and rear generators 22 respectively fixed to a mobile chassis 20, the front and rear motors 21 being connected with front and rear wheels 23 by front and rear driving shafts 24, the front and rear generators 22 being connected with the front and rear motors 21 by front and rear coupling shafts 25. With such an arrangement, the kinetic energy of the moving automobile when the accelerator pedal is not depressed, is derived from the driving shafts 24 and the thus derived kinetic energy is converted into electric energy. The converted electric energy is stored in a battery 28 and is utilized when the travel spee of the automobile is to be accelerated. Designated at 26 are the universal joints, 27 is a linkage and 29 and 30 are regulators for regulating the electrical energy supplied from the generators to the battery.

The energy regenerating mechanism according to the third embodiment also utilizes the kinetic energy of the moving automobile, the same as those in the first and second embodiments. The generators 22 are turned on or off associated with a positive or negative torque of the driving shafts 24 which is detected by strain gauge 9 mounted on the driving shafts 24 or associated with ON or OFF switches of the motors 21 as described in the first and second embodiments.

Fourth Embodiment (FIG. 6)

An energy regenerating mechanism according to a fourth embodiment is illustrated in FIG. 6.

The arrangement of the energy regenerating mechanism is substantially same as that of the third embodiment excepting that the front and rear generators 22' are attached to the inside of the front and rear wheels 23, and the front and rear generators 22' are connected with the front and rear motors 21 by the front and rear driving shafts 24.

With the arrangement of the energy regenerating mechanism according to the third and fourth embodiments as illustrated in FIGS. 5 and 6, the elements such as differential gears employed in the first and second embodiments can be omitted whereby the motor and the generators can be comparatively miniaturized.

Inasmuch as the motors 21 and the generators 22 or 22' are connected to the wheels 23 by way of the driving shafts 24 and the coupling shafts 25, it is possible to prevent the kinetic energy from being lost and to utilize the kinetic energy effectively by converting it in the electric energy.

Although the invention has been described in its preferred form with a certain degree of particularity, it is to be understood that many variations and changes are possible in the invention without departing from the scope thereof.

What is claimed is:

1. An electric automobile comprising: a chassis; front and rear wheels supporting said chassis for movement; electric motors drivingly connected to said wheels for rotating said wheels, said motors being free from mechanical connection to each other; a battery connected in parallel to said electric motors for supplying electrical energy for operating said electric motors; separate electricity generators each drivingly connected to one of said wheels for transforming into electrical energy the kinetic energy of said automobile while said motors are not driving said wheels, each of said generators being free of electrical connection to its associated motor; conductors connecting said generators in parallel to said battery for supplying said electrical energy for charging said battery; and means for turning off said generators when said motors are driving said wheels and for turning on said generators when said automobile is moving and sad motors are not driving said wheels.

2. An electric automobile according to claim 1, wherein said electricity generators comprise front and rear generators which are attached to the insides of said front and rear wheels, said front and rear generators being connected with said motors by front and rear driving shafts.

3. An energy regenerating mechanism of an automobile having front and rear wheels, comprising: front and rear electric motors associated with said front and rear wheels, respectively; front and rear driving shafts drivingly connecting said front and rear electric motors to said front and rear wheels, respectively, said motors being free from mechanical connection to each other; front and rear electricity generators associated with said front and rear electric motors, respectively; front and rear coupling shafts drivingly connecting said front and rear electric motors with front and rear electricity generators so that the kinetic energy of said automobile is effective to operate said generators to convert the kinetic energy of said automobile into electrical energy while said motors are not driving said wheels, said generators each being free of electrical connection to its associated motor; a battery connected in parallel to said electric motors for supplying electrical energy for driving said electric motors; conductors connecting said generators in parallel to said battery for supplying electrical energy from said generators to said battery while said motors are not driving sad wheels in order to charge said battery; and means for turning off said generators when said motors are driving said wheels and for turning on said generators when said automobile is moving and said motors are not driving said wheels.

4. An energy regenerating mechanism of an automobile according to claim 3, wherein said means for turning on and turning off said generators comprises strain gauges mounted on said front and rear driving shafts for detecting the torque of said front and rear driving shafts and connected for turning said generators on or off.

* * * * *